(12) United States Patent
Hotomi

(10) Patent No.: US 6,290,317 B1
(45) Date of Patent: Sep. 18, 2001

(54) INKJET PRINTING APPARATUS

(75) Inventor: Hideo Hotomi, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/019,253

(22) Filed: Feb. 5, 1998

(30) Foreign Application Priority Data

Feb. 6, 1997 (JP) .................................................. 9-024016

(51) Int. Cl.$^7$ ........................... B41J 29/38; B41J 2/205
(52) U.S. Cl. ........................... 347/15; 347/10; 347/11
(58) Field of Search ........................ 347/66–71, 10, 347/15, 72, 183, 184, 252, 11, 9

(56) References Cited

U.S. PATENT DOCUMENTS

| | | | |
|---|---|---|---|
| 4,521,786 | * 6/1985 | Bain | 347/10 |
| 4,561,025 | 12/1985 | Tsuzuki | 358/298 |
| 4,980,699 | * 12/1990 | Tanabe et al. | 347/68 |
| 5,402,159 | * 3/1995 | Takahashi | 347/72 X |
| 5,461,403 | * 10/1995 | Wallace | 347/10 |
| 5,471,231 | * 11/1995 | Hiraishi | 347/68 |
| 5,552,809 | * 9/1996 | Hosano | 347/10 |
| 5,557,304 | * 9/1996 | Stortz | 347/15 |
| 5,639,508 | * 6/1997 | Okawa et al. | 427/100 |
| 5,943,079 | * 8/1999 | Yoshida | 347/70 X |
| 6,024,438 | 2/2000 | Koike et al. | 347/43 |

FOREIGN PATENT DOCUMENTS

| | | |
|---|---|---|
| 0437062 | 7/1991 | (EP) . |
| 6-182998 | 7/1994 | (JP) . |

\* cited by examiner

*Primary Examiner*—Huan Tran
*Assistant Examiner*—An H. Do
(74) *Attorney, Agent, or Firm*—Sidley Austin Brown & Wood

(57) ABSTRACT

An inkjet printing apparatus having a print head and a control system to control the discharge of variable size ink drops from the print head. The control system for printing half-tone images applies pulse voltages of varying waveforms to the print head to control the volume of ink discharged, thereby controlling the diameter of a printed ink dot on a receiving print medium.

18 Claims, 8 Drawing Sheets

INKJET PRINTING APPARATUS

FIELD OF THE INVENTION

The present invention relates to an inkjet printing apparatus, and in particular, to an inkjet printing apparatus which prints an image by discharging an ink drop by means of a piezoelectric element.

BACKGROUND OF THE INVENTION

Conventionally, there are known inkjet printers having print heads provided with a piezoelectric element (PZT).

For such print heads, a pulse voltage corresponding to image information is applied to the piezoelectric element, causing a predetermined distortion of the piezoelectric element. This distortion pressurizes ink inside an adjacent container, or ink channel, and an ink drop is discharged from the ink channel toward a print sheet, thus forming a printed ink dot. A plurality of printed ink dots yields an image on the print sheet.

In the inkjet printers described above, a distortion of a varied magnitude is generated in the piezoelectric element by varying the pulse amplitude (intensity) of the applied pulse voltage. The quantity of ink discharged from the nozzle is determined by the magnitude of the applied pulse voltage. Consequently, by adjusting the quantity of ink within an ink drop, a plurality of printed ink dot diameters can be obtained. For purposes of printing, varying ink dot diameters allows image tones to be expressed, for example, a large diameter ink drop expresses dark portions of an image, while a small diameter ink drop expresses light portions of an image.

FIGS. 13 and 14 are graphs showing examples of waveforms of a series of pulse voltages applied to piezoelectric elements of an inkjet printer print head for the purpose of discharging ink.

FIG. 13 illustrates a series of pulse voltages having a set amplitude from between 5 V to 50 V. Consequently, application of such pulse voltages to a print head, being constructed in a manner consistent with the above description, would result in ink drops having different volumes being discharged, wherein the volume of an ink drop is proportional to the pulse amplitude of its generating pulse.

Similarly, FIG. 14 illustrates a series of pulse voltages having a set amplitude from between 5 V to 50 V. Ink drops of different sizes, i.e., volumes, would be formed and discharged in accordance with these applied pulse amplitudes, thereby producing printed ink dots of different diameters on a print sheet. Note that, the rising portions of the 5 V and 10 V pulse voltages are steeper than the remaining pulse voltages. The steeper rising portions are used to suppress variations in printed ink dot shape by increasing the discharge velocities of the ink drops.

As shown in FIGS. 13 and 14, high amplitude voltage pulse voltages are necessary to provide a full range of printed ink dot diameters. Consequently, a power source, an amplifier, a switching IC, and so forth used for an electric circuit for generating such pulse voltages are required to have high voltage ratings, large capacities, and high responsivity. Understandably, these requirements cause increased production costs, increased circuit size, and the like.

SUMMARY OF THE INVENTION

The present invention is directed to overcoming the problems described above. According to one embodiment of the present invention, an inkjet printing apparatus is disclosed for producing half-tone images on a print sheet in accordance with input image data. The inkjet printing apparatus forms such images by discharging ink from a print head. The inkjet printing apparatus according to the present invention includes at least one ink chamber, suitable for storing ink, having a flexible wall which defines a portion of the ink chamber; at least one piezoelectric element contacting the flexible wall of the at least one ink chamber; and a driver to drive the at least one piezoelectric element in accordance with input image data. The driver applies a drive voltage having a pulse width corresponding to a desired tone of the input image data.

With particular regard to the at least one piezoelectric element, it has a first surface contacting the flexible wall of the at least one ink chamber. The at least one piezoelectric element is also polarized in a polarized direction, the polarized direction being perpendicular to the flexible wall of the at least one ink chamber. For deformation of the at least one piezoelectric element, the drive voltage is applied to the piezoelectric element in a direction parallel to said polarized direction, and said piezoelectric element deforms in the polarized direction in response to an applied drive voltage.

A method of forming a half-tone image using such apparatus could involve applying a first pulse voltage to a piezoelectric element head to thus discharge an ink drop to form a printed ink dot having a first diameter, the first pulse voltage having a first waveform including a first rising interval, a first pulse amplitude duration interval at a first pulse amplitude, and a first falling interval, and applying a second pulse voltage to a piezoelectric element to thus discharge an ink drop to form a printed ink dot having a second diameter, the second diameter being greater than the first diameter, the second pulse voltage having a second waveform including a second rising interval, a second pulse amplitude duration interval at a second pulse amplitude, and a second falling interval.

For the second diameter of a second printed ink dot to be greater than the first diameter of a first printed ink dot, a variety of modifications may be made with respect to the waveforms of the first and second pulse voltages. For example, a slope of the second falling interval may be made greater than a slope of the first falling interval; the second pulse amplitude duration interval may extend longer than the first pulse amplitude duration; or a slope of the first rising interval may be made greater than a slope of the second rising interval.

An object of the present invention is to provide an inkjet printing apparatus capable of reducing both the size of a circuit for printing an image and production cost, maintaining printing performance and quality.

Other objects and advantages of the present invention will be apparent to those of ordinary skill in the art having reference to the following specification together with the drawings.

BRIEF DESCRIPTION OF THE DRAWINGS

Referring now to the drawings in which like reference numerals and letters indicate corresponding elements throughout the several views, if applicable.

DETAILED DESCRIPTION OF THE PREFERRED EMBODIMENTS

An inkjet printer according to an embodiment of the present invention will be described below with reference to the drawings.

Figure 1:
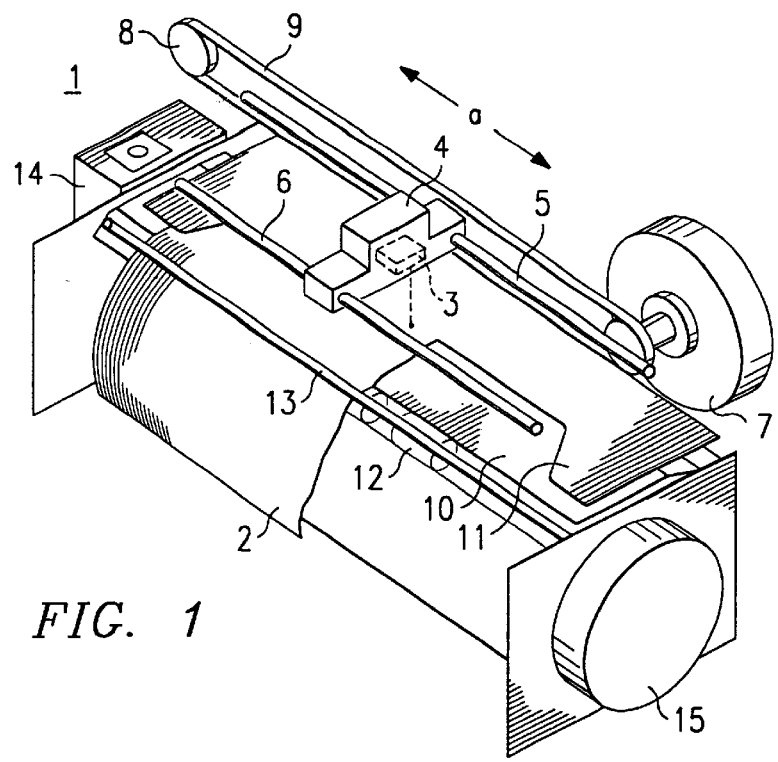
FIG. 1 is a perspective view of an inkjet printer according to an embodiment of the present invention.

FIG. 1 is a perspective view schematically showing the construction of an inkjet printer 1 according to an embodiment of the present invention. The inkjet printer 1 includes an inkjet-type print head 3; a carriage 4 for holding the print head 3; shafts 5 and 6 for reciprocating the carriage 4 in parallel with a printing surface of a print medium 2; a driving motor 7 for reciprocating the carriage 4 along the shafts 5 and 6; a timing belt 9 for transforming the rotation of the driving motor 7 into a reciprocating motion of the carriage 4; and an idling pulley 8. The inkjet printer 1 accommodates a print medium 2, or a print sheet, wherein a print sheet 2 may be a paper sheet (for example, Superfine™ paper, Epson Corporation), a thin, plastic sheet or film, or the like.

The carriage 4 is reciprocated by a combination of the driving motor 7, the idling pulley 8, and the timing belt 9 in the direction a, wherein the print head 3 mounted thereto successively prints images one line at a time. Every time the printing of one line is completed, the print sheet 2 is fed in its lengthwise direction to allow printing of a next line and to generate an image on the print sheet 2.

Figure 5:
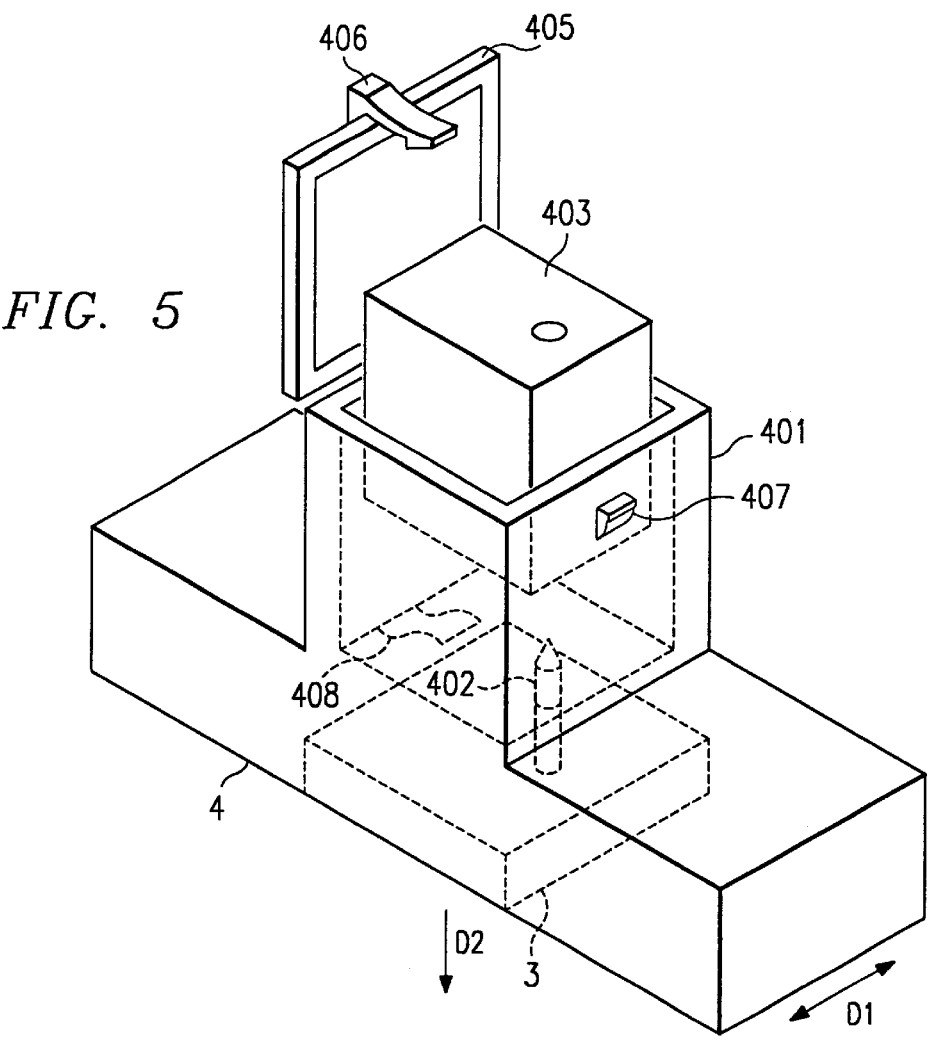
FIG. 5 is a perspective view illustrating a carriage for holding the print head of FIG. 2.

Referring to FIG. 5, the periphery of the carriage 4 includes a casing 401 for receiving an ink cartridge 403 for storing ink 305 therein; a casing lid 405; an ink supply pin 402 which receives and directs ink 305 from the ink cartridge 403 to the print head 3; an urging clutch 406 for fixing the casing lid 405 to the casing 401 when the casing lid 405 is closed; an urging clutch lock 407; and a leaf spring 408 which supports the ink cartridge 403 against the casing lid 405 when the casing lid 405 is in a closed position. For printing, the carriage 4 is moved in a direction corresponding to arrow D1, wherein ink drops are discharged in accordance with the arrow D2.

The inkjet printer 1 further includes a platen 10 which concurrently serves as a guide plate for guiding the print sheet 2 along a transfer path; a sheet pressing plate 11 for pressing the print sheet 2 against the platen 10 to prevent lifting; a discharging roller 12 for discharging the print sheet 2; a spur roller 13; a recovering system 14 for recovering a defective ink discharge of the print head 3; and a paper feeding knob 15 for manually feeding the print sheet 2.

A print sheet 2 is fed either manually or by a paper feeding unit (not shown), such as a cut sheet feeder, into a printing section where the print head 3 and the platen 10 face each other. In this stage, the amount of rotation of a paper feeding roller (not shown) controls the feeding of the print sheet 2 into the printing section.

The print head 3 of the inkjet printer 1 and its periphery will be described next with reference to FIGS. 2 through 5.

Figure 2:
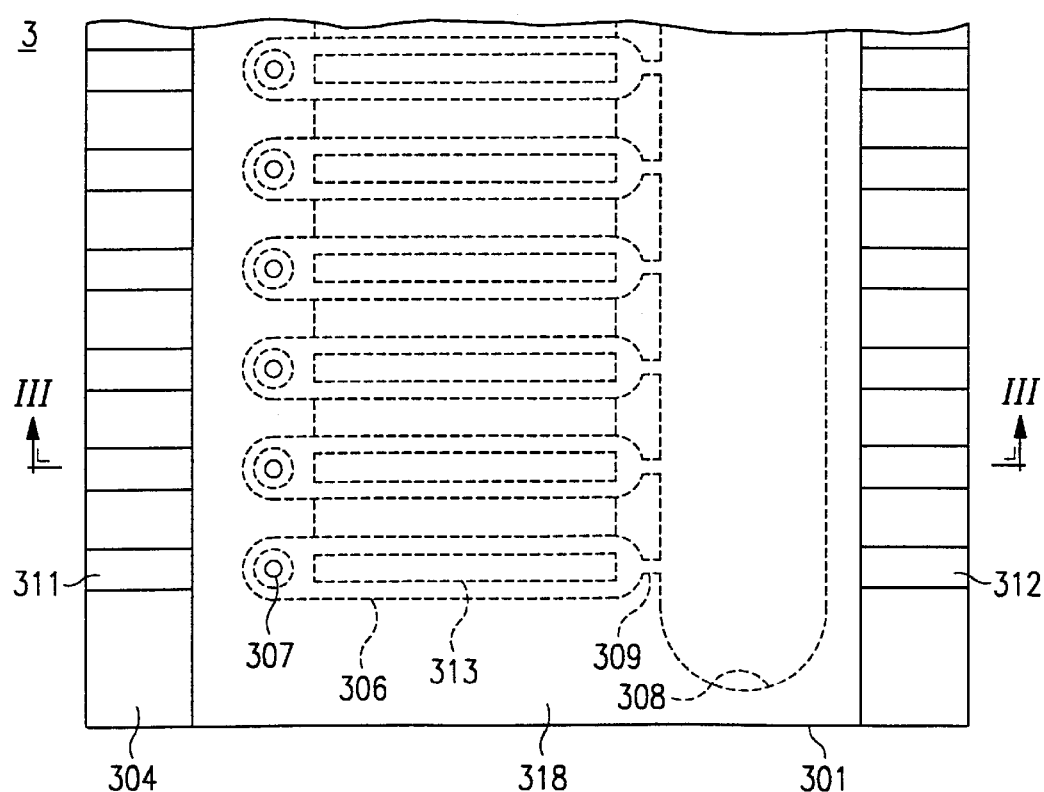
FIG. 2 is a plan view illustrating a print head of the present invention.
Figure 3:
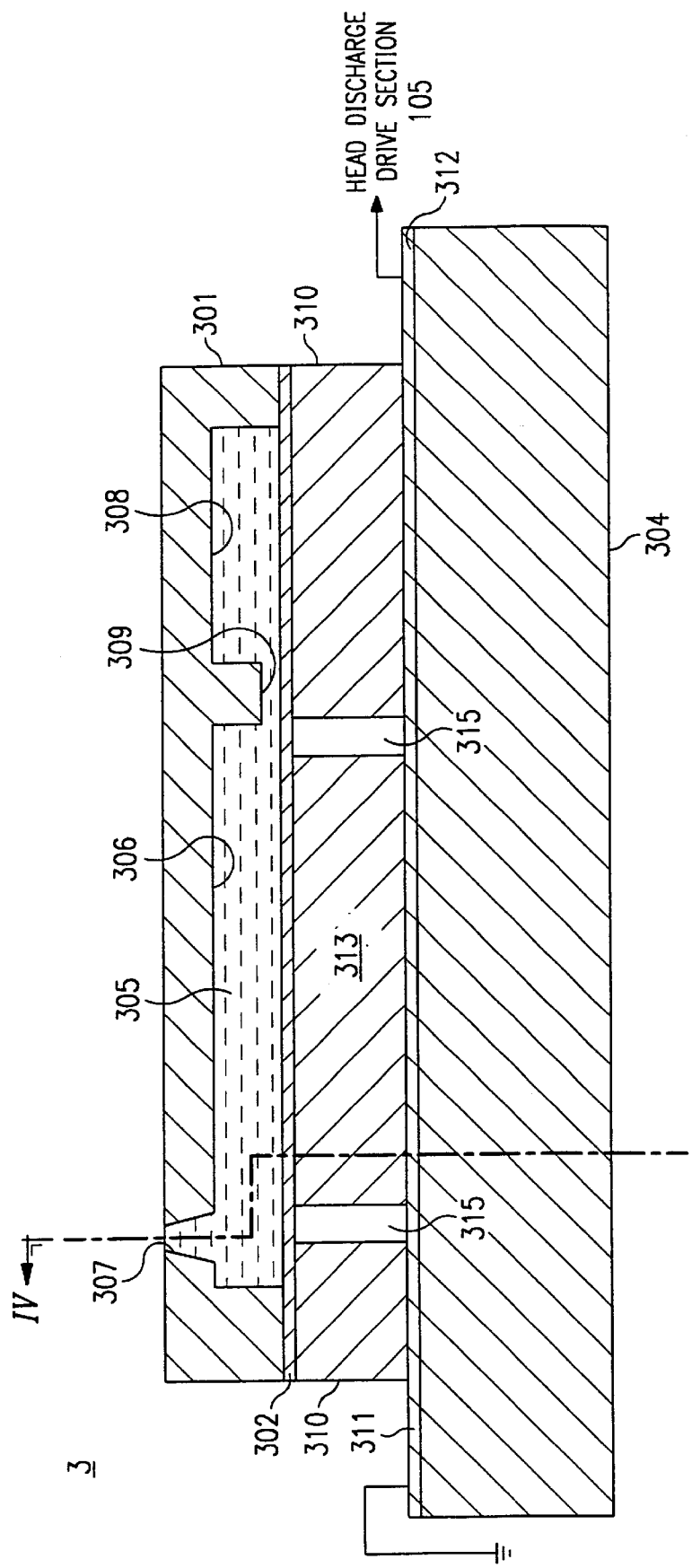
FIG. 3 is a sectional view taken along line III—III of the print head of FIG. 2.
Figure 4:
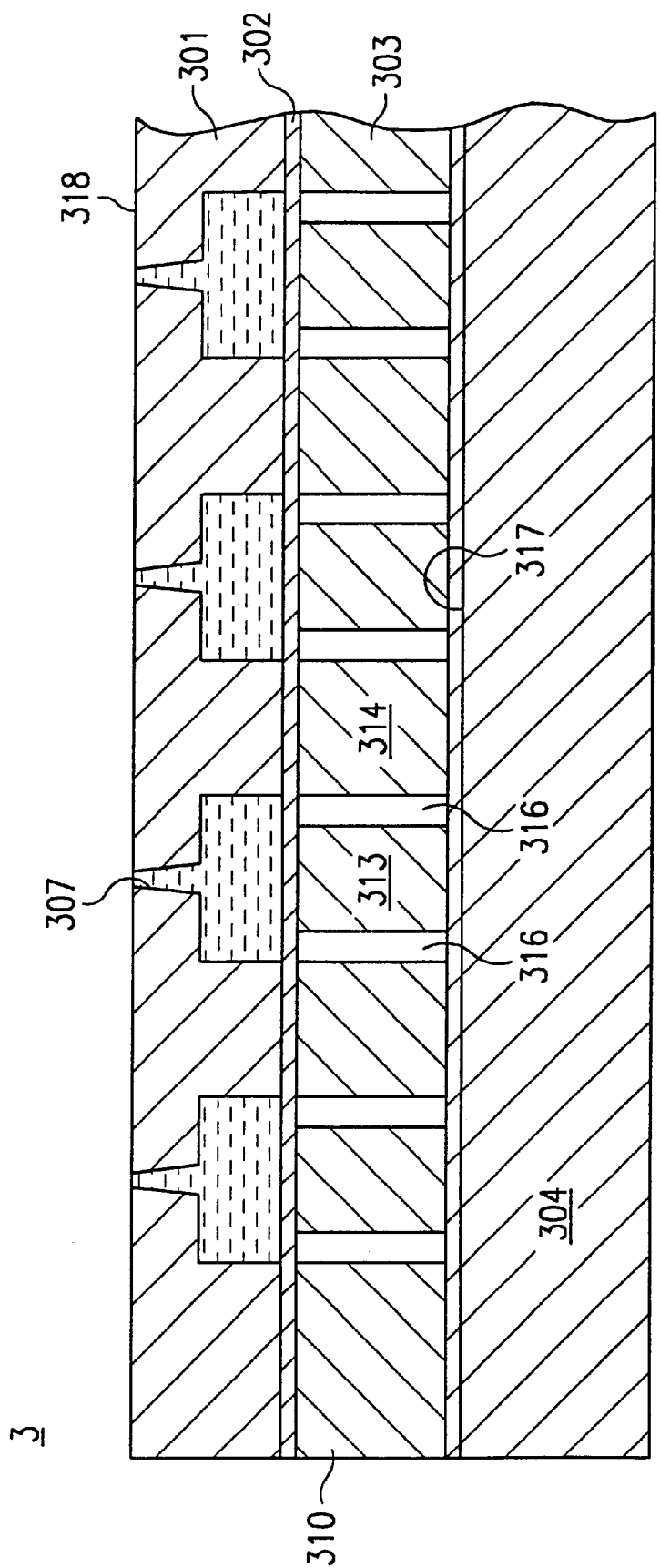
FIG. 4 is a sectional view taken along line IV—IV of the print head of FIG. 3.

FIGS. 2, 3, and 4 illustrate the print head 3 of the present invention. Specifically, FIG. 2 is a plan view of the print head 3, FIG. 3 is a section view taken along the line III—III of the print head 3 of FIG. 2, and FIG. 4 is a section view taken along the line IV—IV of the print head 3 of FIG. 3.

Referring to FIG. 3, the print head 3 is constructed of a nozzle plate 301, a membrane 302, a piezoelectric member 303, and a base plate 304 in an integrally stacked configuration.

The nozzle plate 301 is constructed of metal, synthetic resin, ceramic, or a like material. A surface of nozzle plate 301, which faces membrane 302, is finely finished by electroforming, photolithography or the like, so that a plurality of recesses are formed. These recessions establish a plurality of ink channels 306 for storing ink 305; an ink supplying chamber 308 that contains resupply ink 305; and ink inlets 309 that connect ink channels 306 to ink supplying chamber 308. The surface in which these recessions are formed is further provided with an ink repellent layer, for example, a Teflone coating (DuPont Corp., Wilmington, Del.).

The ink channels 306 are elongated in a lateral direction with respect to print head 3 and are arranged in parallel in a direction perpendicular to such lateral direction. The ink supplying chamber 308, positioned to one side of the ink channels 306, is in fluid communication with an ink cartridge 403 (FIG. 5) and operates to supply ink 305 from the ink cartridge 403 to ink channels 306. Extending from an outer surface of print head 3 to ink channels 306, nozzles 307 are positioned at an end of the ink channels 306 opposite the ink supply chamber 308. In at least one embodiment, nozzles 307 are convergently tapered, where the ink channel 306 side diameter is wider than the exit diameter.

In a preferred embodiment, ink 305 is a composition including at least a solvent, a bodying agent, a colorant, and an additive. Specifically, a preferable ink 305 comprises a solvent having approximately 80.9 wt % of water and approximately 11.0 wt % of polyvalent alcohol (DEG); a bodying agent having approximately 2.5 wt % of polyvalent alcohol (PEG#400); a colorant having approximately 4.6 wt % of dye (for example, BK-SP, Bayer Corp.); and an additive having approximately 0.8 wt % of surface active agent (for example, Olfin E1010) and approximately 0.2 wt % of a pH controlling agent (for example, $NaHCO_3$). An ink having the preferred composition has a surface tension of approximately 36 dyn/cm and a viscosity of approximately 2.0 cp at a temperature of 25° C.

Returning to the construction of the print head 3, membrane 302 is formed of a thin film material and is fixed between the nozzle plate 301 and the piezoelectric member 303. As a specific portion of the piezoelectric member 303 corresponds to each ink channel 306 and such portions are made to deform for the purpose of discharging an ink drop from such ink channels 306 (as will be discussed in greater detail below), the membrane 302 does not prevent the deformation of the piezoelectric member 303 portions but rather yields so as to transmit such deformation to ink channels 306.

The piezoelectric member 303 of the present invention is formed from a piezoelectric element (PZT), wherein the piezoelectric member 303 serves as an energy source for discharging ink 305 from the print head 3. Generally, a voltage is applied to a specific portion of the piezoelectric member 303, resulting in a distortion of such portion. Each piezoelectric member 303 portion corresponds to an ink channel 306. Accordingly, the distortion of a piezoelectric member 303 portion effects a change in volume in its corresponding ink channel 306 containing ink 305. By such change in volume, ink 305 is discharged through a nozzle 307.

The piezoelectric member 303 is fixed between the membrane 302 and the base plate 304. A conductive adhesive is used to join at least the piezoelectric member 303 and the base plate 304, wherein the piezoelectric member 303 is joined to the base plate 304 with respect to a wiring section 317. Prior to the membrane 302 being fixed in place, the piezoelectric member 303 is cut longitudinally and laterally in a dicing process, producing a series of longitudinal grooves 315 and lateral grooves 316. Consequently, the piezoelectric member 303 is separated into piezoelectric elements 313 corresponding to each ink channel 306; partition walls 314 positioned between adjacent piezoelectric members 313; and peripheral walls 310 which encloses these members.

On a surface of the base plate 306 which faces the piezoelectric member 303, a wiring section 317 is provided having a common electrode section 311 and an individual electrode section 312. The common electrode section 311 is electrically coupled to ground and each of the piezoelectric members 313, and the individual electrode section 312 is electrically coupled to head expulsion drive unit (FIG. 6) and to each of the piezoelectric members 313.

Figure 15:
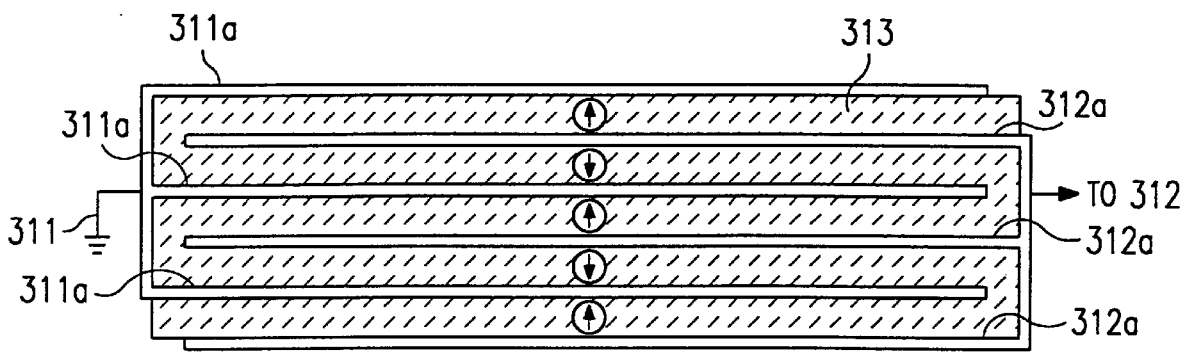
FIG. 15 illustrates a multi-layer piezoelectric element for one embodiment of the print head of FIG. 2.

For one embodiment, the piezoelectric member 303 consists of a twenty-two layer laminate structure, wherein each layer is approximately 22 μm thick. FIG. 15 illustrates a multi-layer piezoelectric element 313, wherein each layer has a specific polarized direction (indicated by the respective encircled arrows). The indicated polarized direction of each layer, the direction of an applied drive voltage, and the deformation of such layer are identical. For such embodiment, the common electrode section 311 on the base plate 304 is connected to common electrodes 311a positioned within the piezoelectric elements 313, and the individual electrode section 312 on the base plate 304 is connected to individual electrodes 312a positioned within the piezoelectric elements 313. The multi-layer structure of this embodiment enables this piezoelectric element 313 to deform very quickly, thereby enabling effective formation of small volume ink drops.

Figure 16:
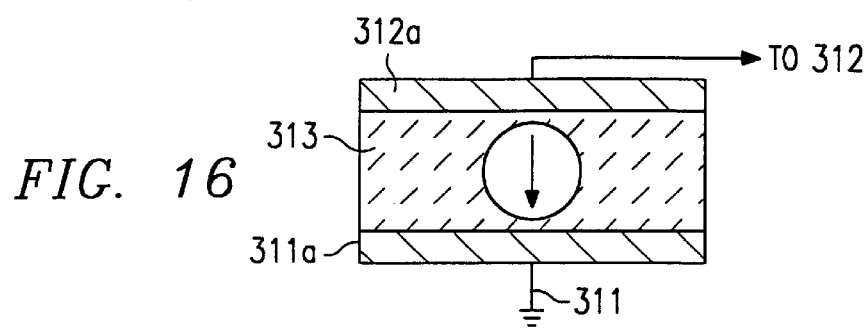
FIG. 16 illustrates a mono-layer piezoelectric element for an alternative embodiment of the printing of FIG. 2.

As an alternative embodiment, FIG. 16 illustrates a monolayer piezoelectric element 313 having common electrode 311a and individual electrode 312a positioned on respective lower and upper surfaces (relative to FIG. 16) of the piezoelectric element 313. As above, application of a drive voltage to individual electrode 312a causes piezoelectric element 313 to deform in a direction consistent with the indicated polarity direction.

Figure 6:
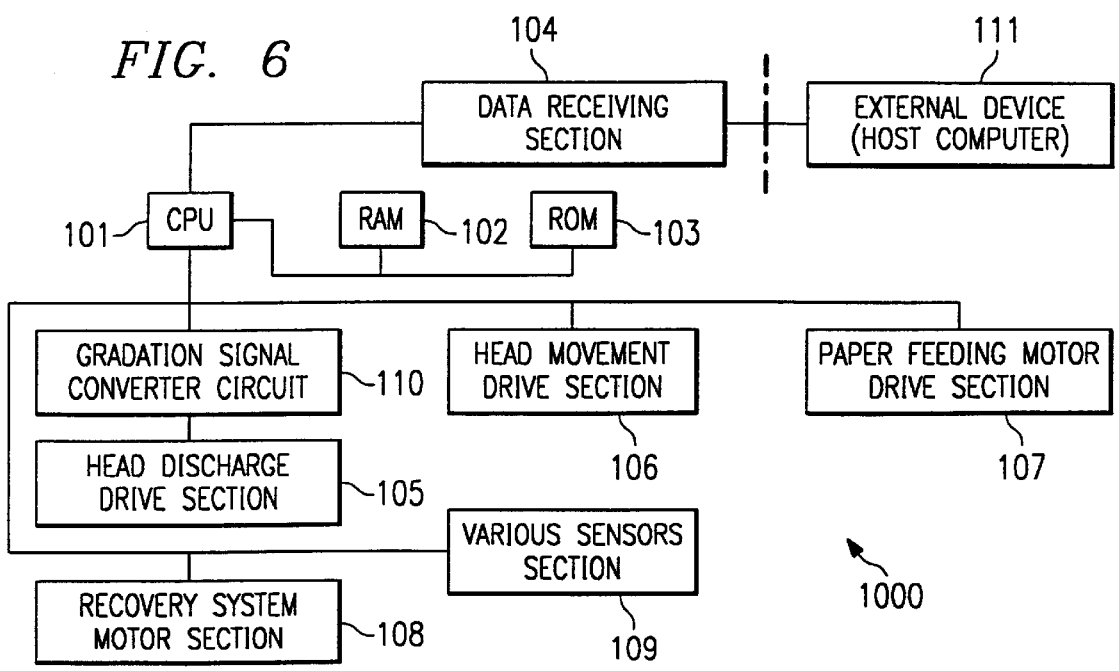
FIG. 6 is a block diagram of a control system of the inkjet printer of the present invention.

FIG. 6 illustrates a control section 1000 of the inkjet printer 1 for delivering, or causing to be delivered, a voltage to each piezoelectric element 313 as well as controlling other elements of the inkjet printer 1 during a print operation. The control section 1000 includes a CPU 101, a RAM 102, a ROM 103, a data receiving section 104, a head discharge drive section 105, a head movement drive section 106, a paper feeding motor drive section 107, a recovery system motor drive section 108, and various sensors section 109. A gradation signal converter circuit 110 is further provided between the CPU 101 and the head discharge drive section 105.

The CPU 101, which controls the entire inkjet printer 1, executes a program stored in the ROM 103. The program includes at least two primary portions: (i) an image forming portion for forming an image on the print sheet 2 based on image data and (ii) a print head clearing portion for clearing nozzles 307 as occasions demand.

The portion for forming an image executes a process in connection with an external device 111, for example, a host computer, for receiving image data to be printed via the data receiving section 104 and for printing an image on a print sheet 2 by controlling the head discharge drive section 105, head movement drive section 106, paper feeding motor drive section 107, and various sensors 109 based on the image data. The portion for clearing print head 3 executes a process for clearing nozzles 307 by controlling the recovery system motor drive section 108 and the various sensors section 109.

Under the control of the CPU 101, the gradation signal converter circuit 110 generates a signal (for example, signal V; see FIG. 7) to be supplied to the head discharge drive section 105, and the head discharge drive section 105 drives the piezoelectric elements 313 of the print head 3 on the basis of such signal. Under the control of the CPU 101, the head movement drive section 106 drives the driving motor 7 for moving the carriage 4 in a direction transverse to a print sheet 2 (direction D1; FIG. 5), and the paper feeding motor drive section 107 drives the paper feeding roller. The CPU 101 further controls the recovery system motor drive section 108 to drive the motors and so forth necessary for clearing nozzles 307, as occasions demand, and returning said nozzles 307 into a satisfactory state.

Focusing on the operation of head discharge drive section 105, head discharge drive section 105 outputs a specified voltage, which serves as a printing signal, across the common electrode and the selected individual electrode electrically coupled to a piezoelectric element 313. Such applied voltage causes deformation of such piezoelectric element 313 in a direction perpendicular to the membrane 302. The deformation of the piezoelectric element 313 is transmitted to the membrane 302, thus pressurizing the ink 305 inside the corresponding ink channel 306. By this pressurization, the ink inside the ink channel 306 is discharged as an ink drop via a nozzle 307, wherein the ink drop is discharged toward a receiving print sheet 2 (see FIG. 1).

Figure 7:
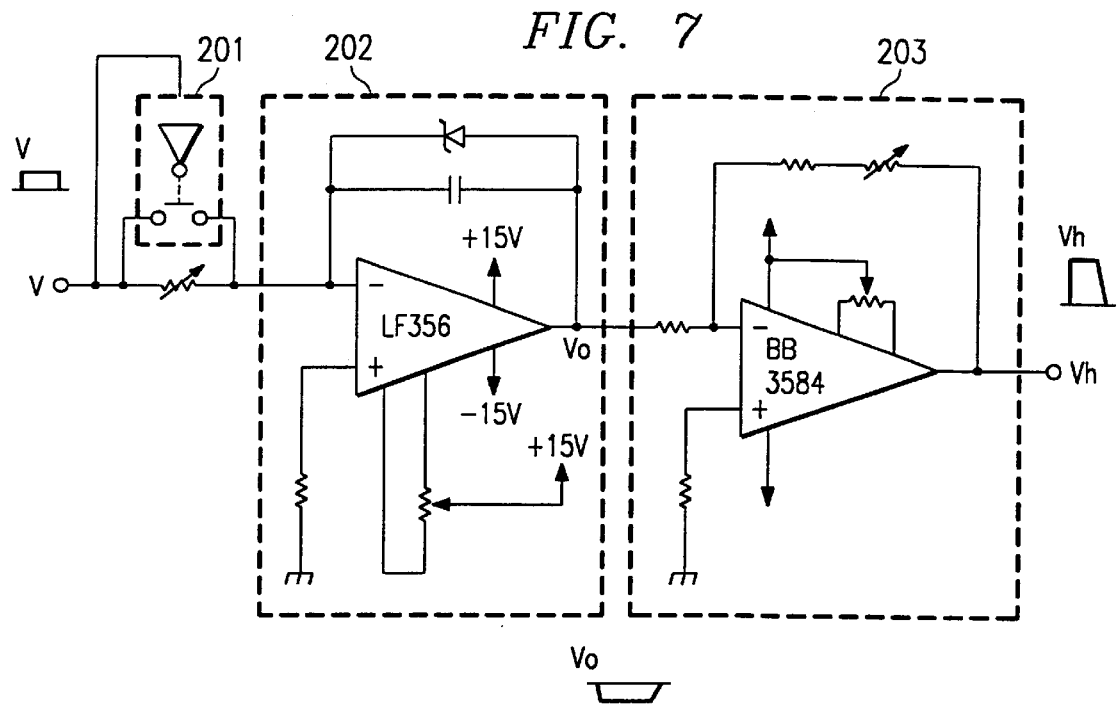
FIG. 7 is a schematic diagram of a head discharge drive section of the present invention.

FIG. 7 illustrates one embodiment of the structure of the head discharge drive section 105. The head discharge drive section 105 includes a ramp waveform electric discharge circuit 201, an inverter circuit 202, and an inverting amplifier circuit 203. In operation, an input signal V, which corresponds to image data, is transformed into signal Vo by the ramp waveform electric discharge circuit 201 and the inverter circuit 202. With particular regard to signal V, the signal is generated in the gradation signal converter section 110 (FIG. 6) and has a pulse width (i.e., the time duration of the pulse) corresponding to an image gradation level. The gradation signal converter section 110, having a counter, counts the (8-bit) image data of 256 gradation levels input from the external device 111 and converts the count result into a pulse width consistent with signal V. Signal V is a rectangular pulse voltage having a specified amplitude (i.e., the electrical intensity of the pulse), for example, 5 V, regardless of the gradation level and has a plurality of signal pulse widths for defining a specific number of gradation levels. With particular regard to the pulse width characteristic, a voltage signal of a short pulse width indicates a low gradation-level data (i.e., light tones), and a voltage signal of a long pulse width indicates a high gradation-level data (i.e., dark tones). In the case where gradation level correction or dither processing and so forth are executed by printer driver software inside the external device 111, the image data is converted into the aforementioned signal V after undergoing these processes.

Signal Vo is subsequently transformed into output signal Vh by the inverting amplifier circuit 203. Signal Vh is applied to piezoelectric elements 313 to drive the piezoelectric elements 313 in accordance with the present invention In reference to FIGS. 8–12, the following description particularly discusses the different waveforms of signal Vh which may be applied to piezoelectric elements 313 as well as the ink drops which are formed therefrom.

Figure 8:
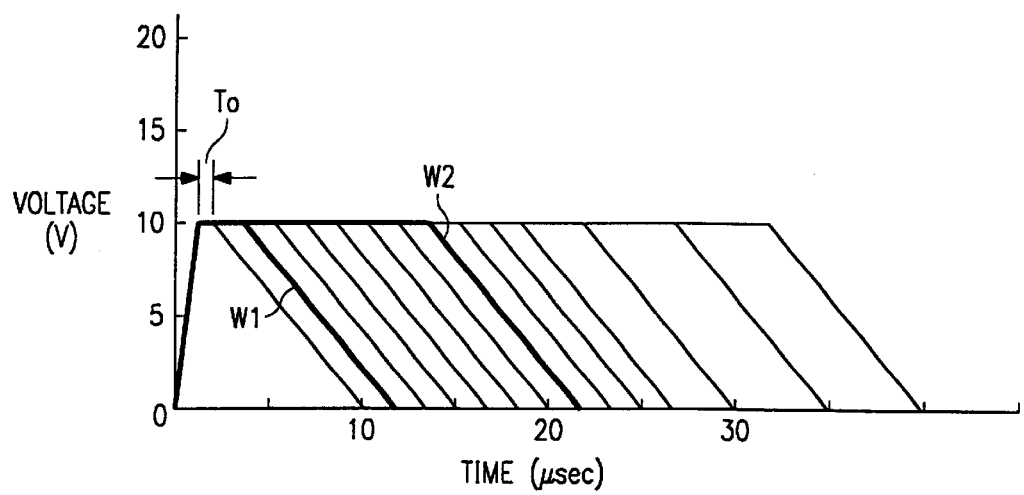
FIG. 8 illustrates a first embodiment of pulse voltages for application to the piezoelectric elements of the print head of the present invention.

FIG. 8 illustrates a plurality of pulse voltages for application to the piezoelectric elements 313. Each of the pulse voltage waveforms has a rising interval, a pulse amplitude duration interval, and a falling interval. The fourteen illustrated pulse voltages represent fourteen gradation levels. The waveforms corresponding to the image data of the fourteen gradation levels are expressed with their voltage application start times aligned on a coordinate system in which the voltage is plotted along the axis of ordinates and the time from the start of the voltage application is plotted along the axis of abscissas.

With regard to the illustrated pulse voltages, a pulse amplitude duration time is varied according to a desired gradation level. As may be observed, the pulse amplitude is made constant at 10 V; however, the pulse amplitude duration time is increased moving from left to right. Consequently, the diameter of a printed ink drop generated from such pulse voltages would also increase with respect to the increasing pulse amplitude duration times.

Figure 9A:
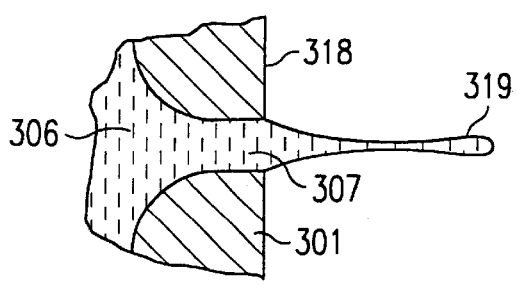
FIG. 9 illustrates the formation of ink drops from the pulse voltages of FIG. 8.
Figure 9B:
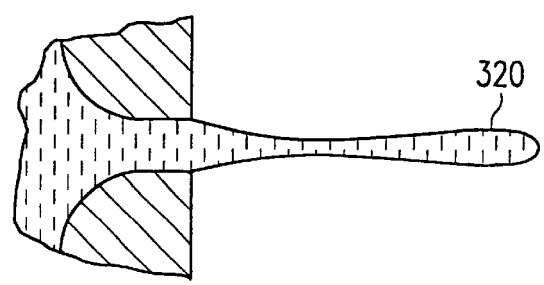

FIGS. 9(a) and 9(b) illustrate ink drop formation in accordance with the pulse voltages W1 and W2, shown in FIG. 8, when such pulse voltages are applied to piezoelectric elements 313. FIG. 9(a) shows an ink column 319 being discharged and formed in accordance with a pulse voltage having the waveform W1, and FIG. 9(b) shows an ink column 320 being discharged and formed in accordance with a pulse voltage having the waveform W2. Due to the duration of waveform W2 relative to waveform W1, the ink column 320 is larger than the ink column 319, and accordingly, ink column 320 shall produce a printed ink dot having a larger diameter than that produced by ink column 319.

A second embodiment of the present invention has a structure similar to that described in detail above. The second embodiment, however, applies pulse voltages to the piezoelectric elements 313 in accordance with the waveforms illustrated in FIG. 10.

Figure 10:
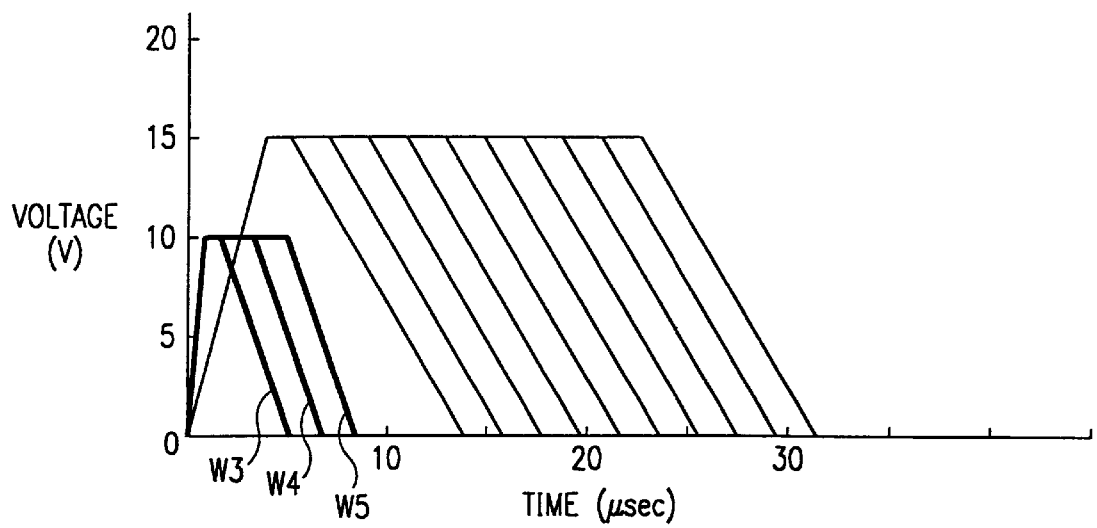
FIG. 10 illustrates a second embodiment of pulse voltages for application to the piezoelectric elements of the print head of the present invention.

Although generally similar to the waveforms of FIG. 8, FIG. 10 illustrates distinguishable waveforms, wherein a first waveform type differs from a second waveform by a rising interval and a maximum amplitude. For the particular example illustrated, waveforms W3, W4, and W5, having a maximum amplitude of 10 V, corresponding to printed ink dots having small diameters, and the remaining pulse voltages have a maximum amplitude of 15 V. The setting of two pulse amplitudes increases the flight velocity of an ink drop of a small diameter, thus preventing variation in a printed ink dot shape.

With regard to the second unique characteristic of waveforms W3, W4, and W5, when a small ink drop is discharged with insufficient velocity, such ink drop tends to be adversely influenced by external disturbances. An adversely influenced ink drop may, for example, deviate from an intended travel path or printing destination. To prevent such deviation, waveforms W3, W4, and W5 have a short rise time, thus increasing a discharge velocity of the subject ink drops. operationally, pulse voltages having a short rise time cause receiving piezoelectric elements 313 to increase their rate of displacement, or distortion.

A third embodiment of the present invention has a structure similar to that described for the first and second embodiments. The third embodiment, however, applies pulse voltages to the piezoelectric elements 313 in accordance with the waveforms illustrated in FIG. 11.

Figure 11:
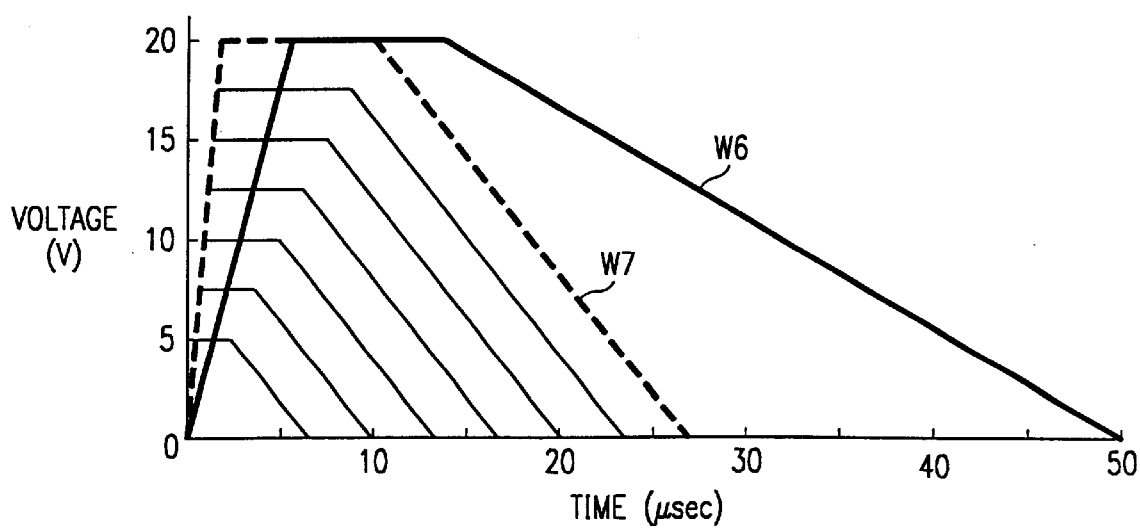
FIG. 11 illustrates a third embodiment of pulse voltages for application to the piezoelectric elements of the print head of the present invention.

Although generally similar to the waveforms of FIG. 8 and FIG. 10, FIG. 11 illustrates distinguishable waveforms, wherein a first waveform type differs from a second by at least the duration period of its falling interval. Waveforms W6 and W7 each illustrate a waveform for producing a large ink drop, such being evidenced by the pulse amplitude being approximately 20 V. To increase the ink drop produced by waveform W6 over that produced by waveform W7 (but maintaining similar maximum pulse amplitude durations), the falling interval of waveform W6 is prolonged. For generating larger ink drops, the gradual rising interval of W6 prevents possible occurrences of dot breakage, satellite formation, and splattering.

In regard to FIG. 11, were any of the illustrated waveforms, other than waveforms W6 and W7, to have a pulse amplitude duration exceeding that of waveform W7 (for purposes of similar waveform comparison), such waveform could produce a printed ink dot having a diameter greater than that produced by waveform W7, wherein such possibility would depend upon a differential in amplitude and a differential in pulse amplitude duration. In such instance, the increase in printed ink dot diameter achievable by the differential in pulse amplitude duration would exceed that increase achievable by the differential for pulse amplitude.

Figure 12:
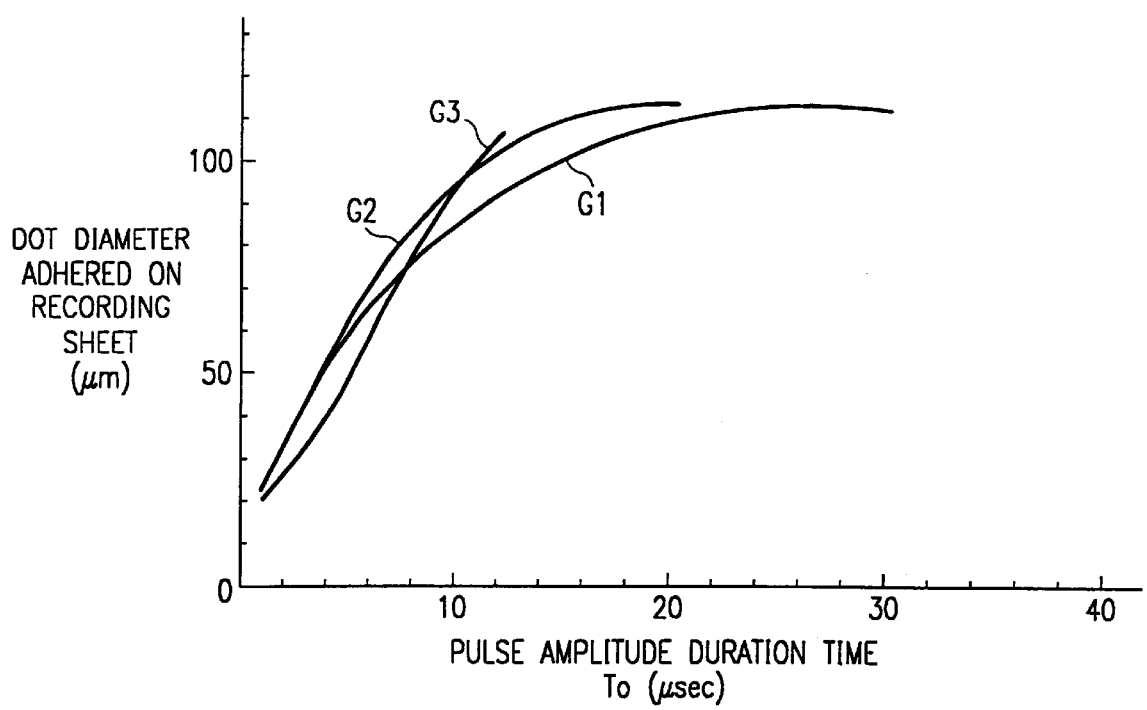
FIG. 12 illustrates a relationship between the diameter of a printed ink dot and the pulse amplitude duration time of a generating pulse voltage for the first, second, and third embodiments of the present invention.
Figure 13:
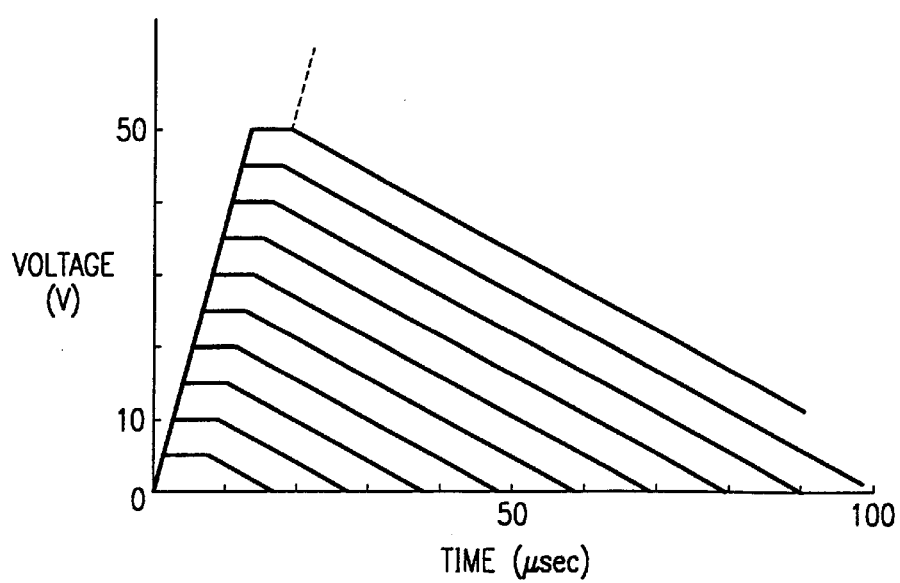
FIG. 13 illustrates representative pulse voltages for the formation of ink drops for conventional inkjet printers.
Figure 14:
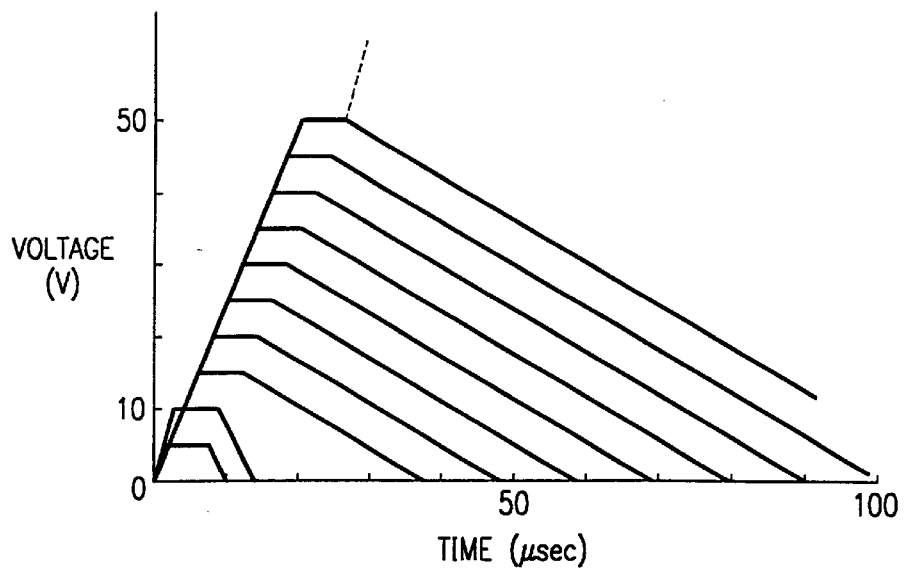
FIG. 14 illustrates representative pulse voltages for the formation of ink drops for conventional inkjet printers.

FIG. 12 illustrates a relationship between printed dot diameters and applied pulse voltage durations for inkjet printers in accordance with the first, second, and third embodiments of the present invention. Curves G1, G2, and G3 represent the first, second, and third embodiments, respectively.

Referring to this illustration, each of the embodiments offer a range of printed ink dot diameters from approximately 20 $\mu$m to approximately 100 $\mu$m. When the pulse amplitude duration time is within a range of not greater than 20 $\mu$sec, the curves G1 through G3 have steep inclinations.

As may be seen, a printed ink dot diameter does not significantly change when a pulse amplitude duration time is made greater than 20 user. Accordingly, it is preferable to set the pulse amplitude duration time at or less than 20 μsec to enable proper control of the printed ink dot diameter.

In accordance with the present invention, printed ink drops, having a range of diameter sizes, may be achieved through setting a plurality of amplitude duration times for those pulse voltages applied to the piezoelectric elements 313 of a print head 3. This technique can obviate the need for using high voltage to achieve a full range of printed ink dot diameters as observed in conventional systems, thus allowing the structure for printing an image to be reduced in size and the related production cost to be reduced.

Although the above embodiments of the present invention are directed to a type of print head which scans in direction D1 (FIG. 5) to print an image, the present invention is not limited to such embodiment. Rather, another embodiment of print head 3 may be fixed and stable and use only the movement of print sheet 2 for purposes of printing, wherein such print head 3 has a width substantially equal to the width of the print sheet 2. For this structure, a plurality of print nozzles are provided along the length of the print head 3; for example, approximately 3307 ink nozzles are required for a print head 3 having a length substantially equal to the width of an A4 page so as to print at a density of 400 dpi.

This application is based on Japanese Patent Application No. 09-024016, the disclosure of which is incorporated herein by reference.

While the invention has been described herein relative to a number of particularized embodiments, it is understood that modifications of, and alternatives to, these embodiments, such modifications and alternatives realizing the advantages and benefits of this invention, will be apparent to those of ordinary skill in the art having reference to this specification and its drawings. It is contemplated that such modifications and alternatives are within the scope of this invention as subsequently claimed herein, and it is intended that the scope of this invention claimed herein be limited only by the broadest interpretation of the appended claims to which the inventors are legally entitled.

What is claimed is:

1. A method of forming a half-tone image by applying a pulse voltage to a print head of a printing device, the pulse voltage being representative of image data, the method comprising the steps of:

receiving image data;

converting each unit of image data into one pulse voltage for driving the print head of the printing device, wherein each pulse voltage is one of a plurality of pulse voltages of a pulse voltage set, and each pulse voltage represents a tone gradation; and applying each pulse voltage to the print head to discharge an ink drop representative of a tone gradation for each corresponding image data unit, wherein a first pulse voltage of the pulse voltage set has a first waveform including a first rising interval, a first falling interval, and a first pulse amplitude at a maximum voltage level, wherein a second pulse voltage of the pulse voltage set has a second waveform including a second rising interval, a second falling interval, and a second pulse amplitude at a maximum voltage level, wherein the second pulse voltage corresponds to a gradation level greater than a gradation level of the first pulse voltage to produce a printed ink dot greater in diameter than a printed ink dot diameter from the first pulse voltage, and wherein the first rising interval is less than the second rising interval, the first falling interval is less than the second falling interval, and the first pulse amplitude and the second pulse amplitude are equal.

2. A method in accordance with claim 1, wherein the first waveform further includes a first pulse amplitude duration time at the first pulse amplitude, and the second waveform further includes a second pulse amplitude duration time at the second pulse amplitude, and the second pulse amplitude duration is greater than the first pulse amplitude duration.

3. A method of forming a half-tone image by applying a pulse voltage to a print head of a printing device, the pulse voltage being representative of image data, the method comprising the steps of:

receiving image data;

converting each unit of image data into one pulse voltage for driving the print head of the printing device, wherein each pulse voltage is one of a plurality of pulse voltages of a pulse voltage set, and each pulse voltage represents a tone gradation; and applying each pulse voltage to the print head to discharge an ink drop representative of a tone gradation for each corresponding image data unit, wherein a first pulse voltage of the pulse voltage set has a first waveform including a first rising interval, a first pulse amplitude duration interval, and a first falling interval, wherein a second pulse voltage of the pulse voltage set has a second waveform including a second rising interval, a second pulse amplitude duration interval, and a second falling interval, and the second pulse voltage corresponds to a gradation level greater than a gradation level of the first pulse voltage to produce a printed ink dot greater in diameter than a printed ink dot diameter from the first pulse voltage, and wherein a slope of the second falling interval is less than a slope of the first falling interval.

4. A method in accordance with claim 3, wherein the first pulse voltage further comprises a first pulse amplitude, and the second pulse voltage further comprises a second pulse amplitude.

5. A method in accordance with claim 4, wherein the first pulse amplitude and the second pulse amplitude are substantially equal.

6. A method in accordance with claim 4, wherein the second pulse amplitude is greater than the first pulse amplitude.

7. A method in accordance with claim 3, wherein the second pulse amplitude duration is greater than the first pulse amplitude duration.

8. A method of forming a half-tone image by applying pulse voltage to an inkjet printing head, comprising the steps of:

receiving image data;

converting each unit of image data into one pulse voltage for driving the print head of the printing device, wherein each pulse voltage is one of a plurality of pulse voltages of a pulse voltage set, and each pulse voltage represents a tone gradation; and applying each pulse voltage to the print head to discharge an ink drop representative of a tone gradation for each corresponding image data unit, wherein a first pulse voltage of the pulse voltage set has a first waveform defining at least a first pulse amplitude duration interval at a first pulse amplitude, wherein a second pulse voltage of the pulse voltage set has a second waveform defining at least a second pulse amplitude duration interval at a second pulse amplitude, the second pulse amplitude being greater than the first pulse amplitude, wherein a third pulse voltage of the pulse voltage set has a third waveform defining at least a third pulse amplitude duration interval at a third pulse amplitude, the third pulse amplitude duration interval being greater than the first pulse amplitude duration interval, and wherein the first pulse voltage corresponds to a lower gradation level than either a gradation level of the second pulse voltage or a gradation level of the third pulse voltage, and the gradation level of the second pulse voltage differs from the gradation level of the third pulse voltage.

9. A method in accordance with claim 8, wherein the third pulse amplitude is greater than the second pulse amplitude.

10. A method in accordance with claim 8, wherein the third pulse amplitude is substantially equal to the second pulse amplitude.

11. A method in accordance with claim 8, wherein the third pulse amplitude is less than the second pulse amplitude.

12. A method in accordance with claim 8, wherein the second pulse amplitude duration interval is greater than the first pulse amplitude duration interval.

13. A method in accordance with claim 8, wherein the second pulse amplitude duration interval is substantially equal to the first pulse amplitude duration interval.

14. A method in accordance with claim 8, wherein the second pulse amplitude duration interval is less than the first pulse amplitude duration interval.

15. A method in accordance with claim 8, wherein the first pulse voltage of the pulse voltage set ejects an ink drop to form a printed ink dot of a first diameter, the second pulse voltage of the pulse voltage set ejects an ink drop to form a printed ink dot of a second diameter, the second diameter being greater than the first diameter and the third pulse voltage of the pulse voltage set ejects an ink drop to form a printed ink dot of a third diameter, the third diameter being greater than the first diameter and the second diameter is larger than the third diameter.

16. A method in accordance with claim 8, wherein the first pulse voltage of the pulse voltage set ejects an ink drop to form a printed ink dot of a first diameter, the second pulse voltage of the pulse voltage set ejects an ink drop to form a printed ink dot of a second diameter, the second diameter being greater than the first diameter and the third pulse voltage of the pulse voltage set ejects an ink drop to form a printed ink dot of a third diameter, the third diameter being greater than the first diameter and the second diameter is smaller than the third diameter.

17. An inkjet printing apparatus for producing half-tone images from input image data, the inkjet printing apparatus comprising:

a print head to discharge ink drops in accordance with an input signal; and a controller, in communication with the print head, to generate an input signal for each unit of input image data, each input signal being representative of a single gradation from a gradation set having a plurality of gradations that collectively establish a range of gradations from a lowest gradation to a highest gradation, the controller being adapted to effect, a first pulse signal, causing the print head to thus discharge an ink drop to form a printed ink dot having a first diameter, the first pulse voltage having a first waveform including a first rising interval, a first falling interval, and a first pulse amplitude at a maximum voltage level, a second pulse signal, causing the print head to thus discharge an ink drop to form a printed ink dot having a second diameter, the second diameter being greater than the first diameter, the second pulse voltage having a second waveform including a second rising interval, a second falling interval, and a second pulse amplitude at a maximum voltage level, wherein the first rising interval is less than the second rising interval, the first falling interval is less than the second falling interval, and the first pulse amplitude and the second pulse amplitude are equal.

18. An inkjet printing apparatus for producing half-tone images from input image data, the inkjet printing apparatus comprising:

a print head to discharge ink drops in accordance with an input signal; and a controller, in communication with the print head, to selectively generate an input signal for each unit of input image data, each input signal being representative of a single gradation from a gradation set having a plurality of gradations that collectively establish a range of gradations from a lowest gradation to a highest gradation, the controller being adapted to effect, a first pulse signal, causing the print head to thus discharge an ink drop to form a printed ink dot having a first diameter, the first pulse voltage having a first waveform including a first rising interval, a first pulse amplitude duration interval at a first pulse amplitude, and a first falling interval, and a second pulse signal, causing the print head to thus discharge an ink drop to form a printed ink dot having a second diameter, the second diameter being greater than the first diameter, the second pulse voltage having a second waveform including a second rising interval, a second pulse amplitude duration interval at a second pulse amplitude, and a second falling interval, wherein a slope of the second falling interval is less than a slope of the first falling interval.

* * * * *